US010922420B2

(12) United States Patent
Allo et al.

(10) Patent No.: US 10,922,420 B2
(45) Date of Patent: *Feb. 16, 2021

(54) VIRTUALIZED VOLUME LEVEL SECURITY

(71) Applicant: Seagate Technology LLC, Cupertino, CA (US)

(72) Inventors: Christopher N. Allo, Lyons, CO (US); Richard O. Weiss, Superior, CO (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/432,539

(22) Filed: Feb. 14, 2017

(65) Prior Publication Data
US 2018/0232524 A1 Aug. 16, 2018

(51) Int. Cl.
H04L 29/06 (2006.01)
G06F 21/60 (2013.01)
G06F 21/62 (2013.01)
H04L 9/08 (2006.01)
H04L 9/14 (2006.01)

(52) U.S. Cl.
CPC ........ *G06F 21/602* (2013.01); *G06F 21/6218* (2013.01); *H04L 9/0894* (2013.01); *H04L 9/14* (2013.01)

(58) Field of Classification Search
CPC .... H04W 12/08; H04L 63/10; H04L 63/0464; H04L 9/14; G06F 21/602; G06F 21/6218
USPC ........................................................ 713/170
See application file for complete search history.

(56) References Cited

U.S. PATENT DOCUMENTS

| 8,654,971 | B2 | 2/2014 | Orsini et al. |
| 8,713,633 | B2 | 4/2014 | Thomas |
| 9,064,127 | B2 | 6/2015 | O'Hare et al. |
| 9,213,857 | B2 | 12/2015 | O'Hare et al. |
| 9,864,874 | B1* | 1/2018 | Shanbhag ............ G06F 21/6218 |
| 10,102,356 | B1* | 10/2018 | Sahin ...................... G06F 21/31 |
| 10,372,926 | B1 | 8/2019 | Leshinsky |
| 2005/0144404 | A1* | 6/2005 | Nashimoto ........... G06F 3/0607 711/154 |
| 2008/0082836 | A1* | 4/2008 | Osaki ...................... G06F 21/62 713/193 |
| 2008/0114980 | A1 | 5/2008 | Sridhar |
| 2009/0268903 | A1* | 10/2009 | Bojinov ................ G06F 3/0622 380/45 |
| 2011/0252237 | A1 | 10/2011 | PalChaudhuri et al. |
| 2012/0239943 | A1* | 9/2012 | Okamoto ............ G06F 21/6218 713/193 |
| 2013/0148810 | A1* | 6/2013 | Goel ..................... H04L 9/0891 380/278 |
| 2014/0164790 | A1 | 6/2014 | Dodgson |
| 2015/0249687 | A1 | 9/2015 | O'Hare et al. |
| 2016/0034721 | A1* | 2/2016 | Moriguchi .......... G06F 21/6218 713/193 |
| 2016/0080323 | A1 | 3/2016 | MacKay et al. |

(Continued)

Primary Examiner — Shewaye Gelagay
Assistant Examiner — Kevin Ayala
(74) Attorney, Agent, or Firm — Holzer Patel Drennan

(57) ABSTRACT

Implementations and methods herein provide a networked storage system including a plurality of physical storage devices configured to store data on a plurality of virtualized volumes, a key store configured to store a plurality of encryption keys, and a security manager configured to encrypt data stored on each of the plurality of virtualized volumes using a different key.

13 Claims, 4 Drawing Sheets

(56) References Cited

U.S. PATENT DOCUMENTS

| | | |
|---|---|---|
| 2016/0275303 A1 | 9/2016 | Narayanaswamy et al. |
| 2016/0379005 A1 | 12/2016 | O'Hare et al. |
| 2017/0288863 A1* | 10/2017 | Dimitrakos ......... G06F 21/6209 |

* cited by examiner

VIRTUALIZED VOLUME LEVEL SECURITY

CROSS-REFERENCE TO RELATED APPLICATION

This application is related to and incorporates in its entirety, U.S. Non-Provisional patent application Ser. No. 15/432,657 entitled "Virtualized Volume Level Messaging" and filed concurrently on 14 Feb. 2017.

BACKGROUND

Cloud data security schemes can employ a variety of techniques to protect data. Such techniques may include data encryption and user authentication. Both encryption and authentication may employ the use of keys to provide increased security. For example, a key may be used to encrypt data, or a key may be used to authenticate a user requesting access to network resources. The key may be shared among multiple users or devices.

SUMMARY

Implementations and methods herein provide a networked storage system including a plurality of virtualized volumes, data stored on each of the plurality of virtualized volumes being encrypted using a different key.

An implementation further provides a networked data storage system including a plurality of virtualized volumes, data stored on each of the plurality of virtualized volumes being encrypted using a different key and a security manager configured to receive a request from a client to store data to a network resource comprising a plurality of virtualized volumes and to determine an identity of a target virtualized volume, the security manager is further configured to retrieve an encryption key from a key store to encrypt data on the one of the plurality of virtualized volumes.

An alternative implementation further provides a method of secure communication with storage devices, including receiving, at a virtualized volume security manager, a request to store data on one of a plurality of virtualized volumes, determining a target volume level, retrieving an encryption key associated with the target volume level, encrypting the data using the encryption key, and storing the data on one or more of a plurality of physical drives associated with the target volume level.

These and various other features and advantages will be apparent from a reading of the following Detailed Description.

BRIEF DESCRIPTIONS OF THE DRAWINGS

DETAILED DESCRIPTION

Figure 1:
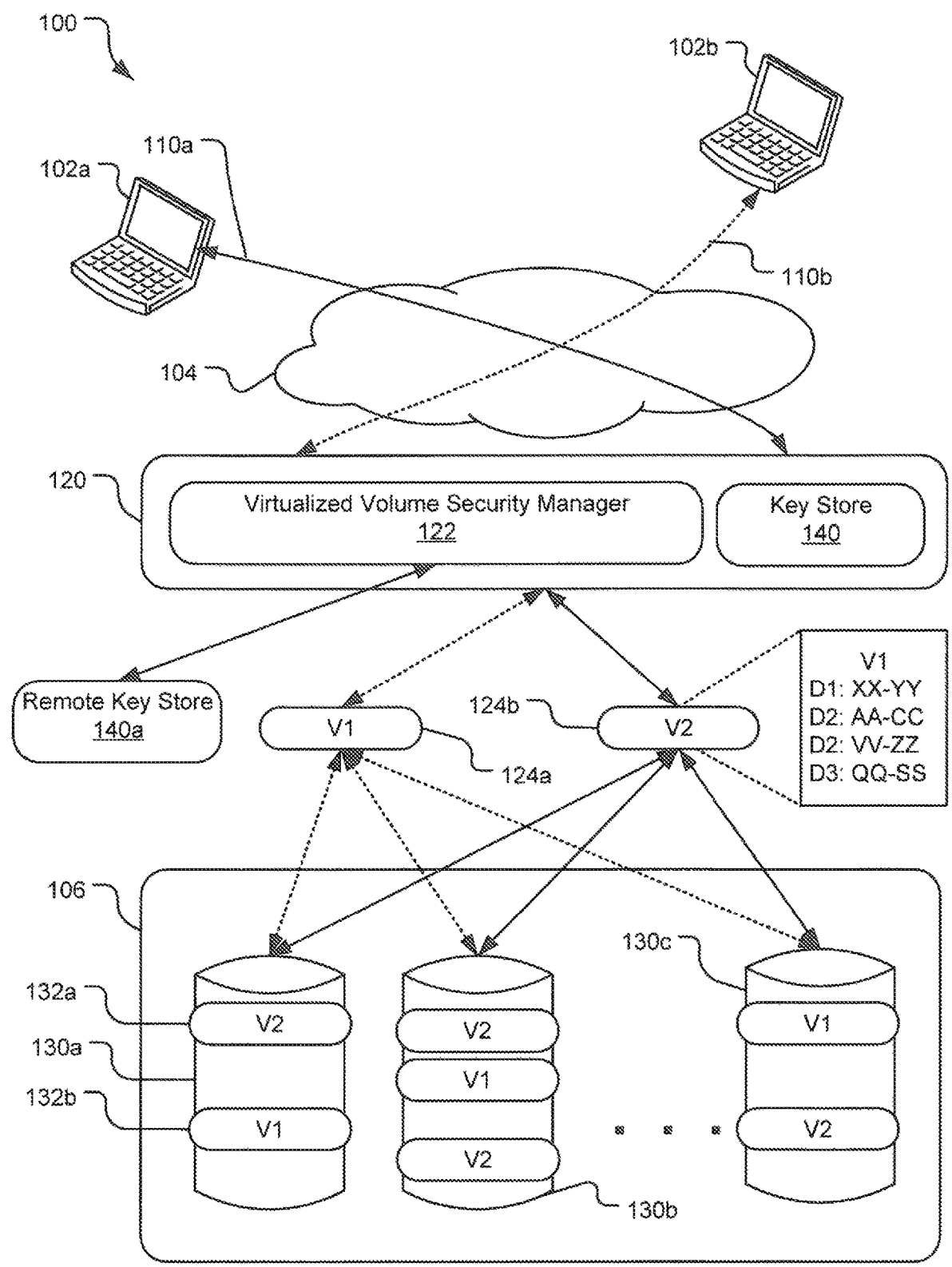
FIG. 1 illustrates an example implementation of a networked storage system using virtualized security structure disclosed herein.

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

As more and more data is stored remotely (e.g., in the cloud) rather than locally (e.g., a user device), data security is increasingly important. Cloud security schemes can employ a variety of techniques to protect data, such as encryption, authorization, password systems, etc. Data encryption generally involves the transformation of input data into an encrypted output using a selected cryptographic algorithm, function or operation. The algorithm/function may utilize one or more keys to effect the transformation from input data (e.g., plain text) to output data (e.g., cypher text). If encrypted data is to be sent from a first user/device to a second user or device, then the second user or device must have knowledge of the one or more keys to decrypt the data such that it may be utilized.

In secure storage systems, data security schemes are enforced at the storage device level in a variety of ways. For example, a user may first require authentication before the user is allowed access to the secure storage systems. Multi-device storage systems may provide large scale storage capabilities in a distributed computing environment (e.g., cloud based object storage systems, RAID storage system, large database processing systems, etc.). Multi-device storage systems may utilize encrypted data at the storage device level and authentication passwords that can be used between the storage device and a host to identify and authenticate a data exchange.

Implementations described herein provide an enhanced security system utilizing virtualized volume level security for remote data storage systems. One or more implementations disclosed herein provide for virtualized volume level security where each virtual volume of data on a server, such as a cloud server, uses a different key for encrypting data for that volume. Thus, for example, a cloud server may be implemented using ten different physical storage drives and contain two virtual volumes spread across the ten different physical storage devices. In such a case, the data stored on the first logical volume is encrypted using a first key and the data stored on the second volume is encrypted using a second key, with the first key being different than the second key.

In an alternative implementation of the system providing virtualized volume level security, messaging to each virtual volume is controlled using a different key. Thus, for example a cloud server may be implemented using twenty different physical storage drives and contain two virtual volumes spread across the ten different physical storage devices with a storage controller configured to access the data on the cloud server. In such a case, messages between the storage controller and the first volume may be controlled using a first key and the messages between the storage controller and the second volume may be controlled using a second key, with the first key being different than the second key.

Specific implementations disclosed herein provide the ability to secure volumes or logical unit numbers (LUNs) and its associated data where each volume may be virtualized in that its associated data is split among many drives.

FIG. 1 illustrates an example implementation of a networked storage system 100 using a virtualized security structure disclosed herein. Specifically, the networked storage system 100 includes a number of user devices 102 configured use a network 104 to access data on a remote data storage system 106. The remote data storage system 106 may be, for example, a cloud server that can be accessed by the network 104 such as the Internet. In an implementation disclosed herein, the remote data storage system 106 may include a plurality of physical storage device such as drives 130 (130a, 130b, 130c, etc.). The drives 130 may be implemented using storage devices such as magnetic disc drives, optical disc drives, tape drives, flash drives, solid-state storage device, etc. In one implementation of the networked storage system 100, the drives 130 may be self-encrypted drives (SED). However, in an alternative implementation, the drives 130 may not be SEDs. In yet alternative implementation, the some of the drives 130 may be SED while the others of the drives 130 may not be SED. While such an implementation may have the drives 130 as SED, it is not a requirement and 130 may also be a non-SED drive.

The networked storage system 100 includes a storage access controller 120 that may be used to control access to data on a remote data storage system 106. In one implementation, the storage access controller 120 may be implemented on a same server or cloud that hosts the remote data storage system 106. However, in an alternative implementation, the storage access controller 120 may be implemented on a different server or cloud compared to the server that hosts the remote data storage system 106.

In the illustrated implementation of the networked storage system 100, the remote data storage system 106 is configured to use virtualized volumes for storing data on the drives 130. For example, at least two of the virtualized volumes V1 124a and V2 124b are illustrated herein. The virtualized volumes V1 124a and V2 124b may also be referred to as logical unit numbers (LUNs). As illustrated, each of the virtualized volumes 124 are mapped to one or more of the drives 130. For example, the Volume V2 124b is illustrated to be mapped to a storage area XX-YY of drive 130a, to two storage areas AA-CC and VV-ZZ of drive 130b, and to a storage area QQ-SS of the drive 130c. The storage access controller 120 may store and update such mapping. In an implementation of the networked storage system 100, the virtualized volumes 124 may be thinly provisioned in that each of the virtualized volumes 124 may have larger virtual storage capacity than the physical storage capacity of the drives 130. In one implementation, the storage access controller 120 may be configured to allocate one virtualized volume to one client. Thus, for example, a client represented by the user 102b may be allocated volume V2 124b. In such implementation, communications 110a from the user device 102a are directed to volume V2 124b. Similarly, communications 110b from the user device 102b may be directed to volume V2 124a. Thus, data from a client may be dispersed among more than one of the drives 130. On the other hand, each of the drives 130 may store data from more than one client. Such virtualized allocation of data over a plurality of devices may make the data on the drives 130 vulnerable to a number of security threats. For example, a client A using the user device 102a may store corrupted data on a storage region XX-YY of the drive 130a such that the corrupted data may affect data from a client B stored on drive 130a.

In an implementation of the networked storage system 100, the storage access controller 120 also includes a virtualized volume security manager 122 (referred to hereinafter as the "security manager" 122) that assigns a different key for storing data to each one of the volumes 124. The security manager 122 may work with a key store 140 configured on the storage access controller 120 to generate encryption keys. The key store 140 may be used to generate encryption keys that may be used to encrypt data stored on the volumes 124. The key store 140 may be locally implemented on the storage access controller 120 or alternatively it may be implemented externally to the storage access controller 120. The implementation discloses such a remote key store 140a that may be implemented on a remote data server. In such an implementation, the virtualized volume security manager 122 may make calls to the remote key store 140a to create and retrieve keys that may be tied to devices 124a, 124b, etc.

For example, the security manager 122 may use a first encryption key when storing data on the volume V1 124a and a second encryption key when storing data to the volume V2 124b. Thus, when a client A using a user device 102a requests for data storage on volume V2 124b, the security manager 122 encrypts the data using the first encryption key irrespective of whether the data is going to be stored on drive 130a, 130b, or 130c. On the other hand, if a client B using the user device 102b requests for data storage on volume V1 124a, the security manager 122 encrypts the data using the second encryption key irrespective of whether the data is going to be stored on drive 130a, 130b, or 130c.

As a result, different sections of any of the drives 130 are encrypted using different encryption keys. For example, a storage area 132a on the drive 130a may be encrypted using the second key that is used for encrypting data of the volume V2 124b whereas a storage area 132b on the same drive 130a may be encrypted using the first key that is used for encrypting data of the volume V1 124a.

In one implementation of the networked storage system 100, the encryption keys used for encrypting data on particular volume of the remote data storage system 106 may be provided by the client that is allocated on a particular volume. For example, the client A using the user device 102a may provide the second encryption key to the storage access controller 120 together with the request 110a for storage or retrieval of data from volume V2 124b. Similarly, the client B using the user device 102b may provide the first encryption key to the storage access controller 120 together with the request 110b for storage or retrieval of data from volume V1 124a. In such an implementation, unless the storage access controller 120 receives a request for access to the virtualized volumes 124 with a proper encryption key, the storage access controller 120 is not capable of decrypting the data from the target volumes. In one implementation, if the storage access controller 120 is not provided the correct encryption key, it does not return any data at all to the requesting device and sends a message that the encryption key is not correct. Alternatively, in some implementation, the storage access controller 120 returns unencrypted data to the requesting device.

In one implementation, the storage access controller 120 extracts the data from a particular storage region of the remote data storage system 106 without decrypting such data, but sends the encrypted data to the client. In such a case, the client at a user device 102 will be able to decrypt and use the data only if they have the decryption key. The implementation of the networked storage system 100 in effect results in the virtualized volumes 124a, 124b to behave like self-encrypted drives (SEDs), even when the drives 130 may or may not be SEDs.

Figure 2:
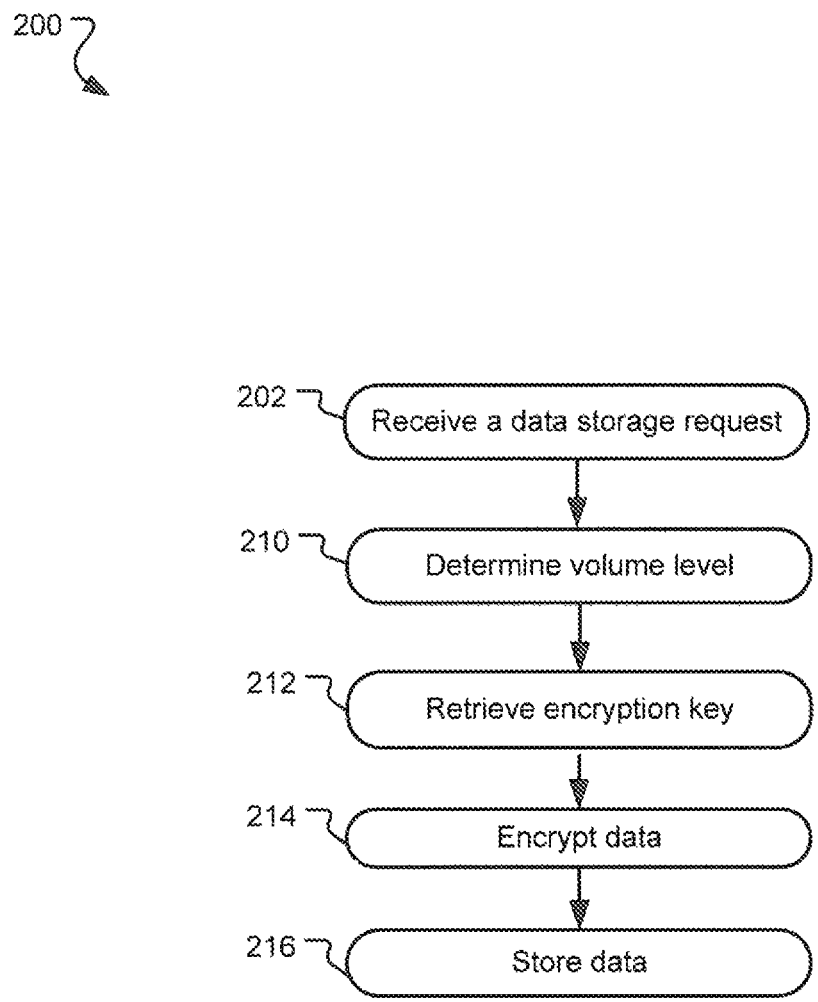
FIG. 2 illustrates example operations for using the networked storage system disclosed herein.

FIG. 2 illustrates example operations 200 for using the networked storage system disclosed herein to store data to various drives of virtualized volumes. Specifically, the operations 200 may be implemented by a virtualized volume security manager such as those described herein. An operation 202 receives a request for storing data to a networked resource, such as a cloud server having various virtualized volumes. The operation 202 may receive a request, such as a request from a client device connected with the security manager via the Internet. An operation 210 determines which of the various volumes is the target of the data storage request.

For example, the network resource may be a cloud storage system with ten drives and one hundred virtualized volumes implemented on the ten drives such as way that each volume may be allocated storage area on one or more of the ten drives. The operation 210 may determine that the target volume level is a volume A of the one hundred volumes. An operation 212 retrieves an encryption key for the target volume. For example, the encryption key may be retrieved from a key store configured on the security manager. Specifically, the key store may be configured to have different key for each volume on the networked storage resource. Subsequently, an operation 214 encrypts the data using the selected key and an operation 216 stores the encrypted data on the target volume.

Figure 3:
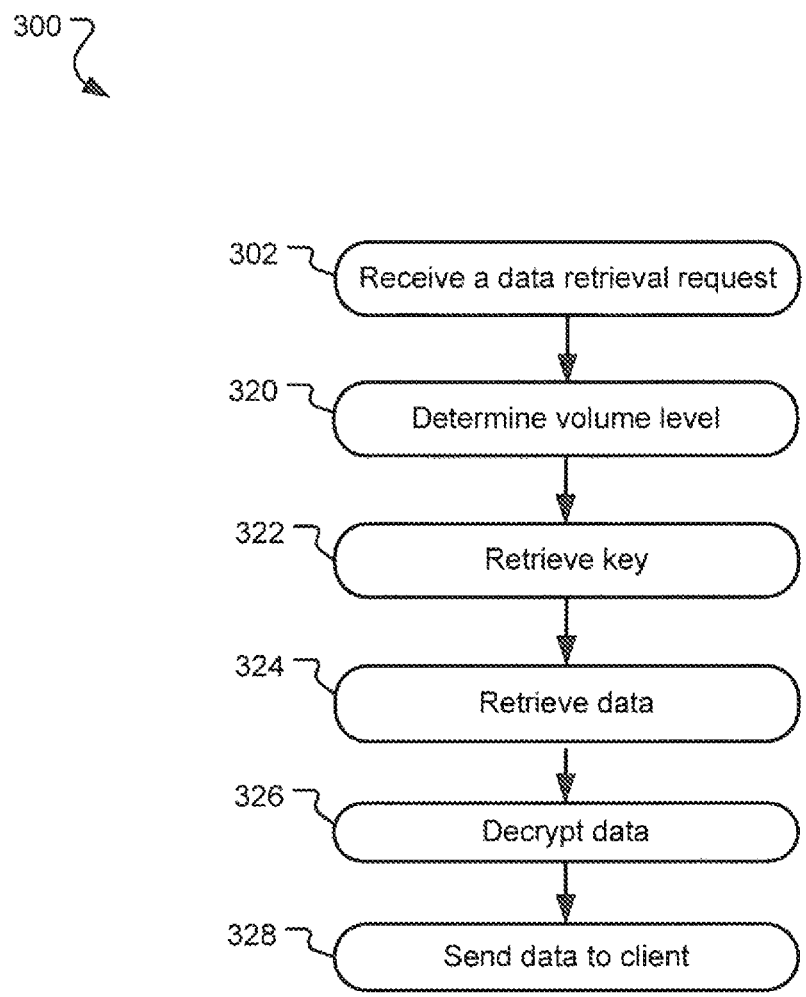
FIG. 3 illustrates alternate example operations for using the networked storage system disclosed herein.

FIG. 3 illustrates example operations 300 for using the networked storage system disclosed herein to retrieve data from various drives of virtualized volumes. Specifically, the operations 300 may be implemented by a virtualized volume security manager such as those described herein. An operation 302 receives a request for retrieving data to a networked resource, such as a cloud server having various virtualized volume. The operation 302 may receive a request, such as a request from a client device connected with the security manager via the Internet. An operation 320 determines the source volume from where the data is to be retrieved. Subsequently, an operation 322 retrieves a key for the source volume. An operation 324 retrieves data from the source target and using the key, an operation 326 decrypts the data, which is sent to the client at operation 328.

Figure 4:
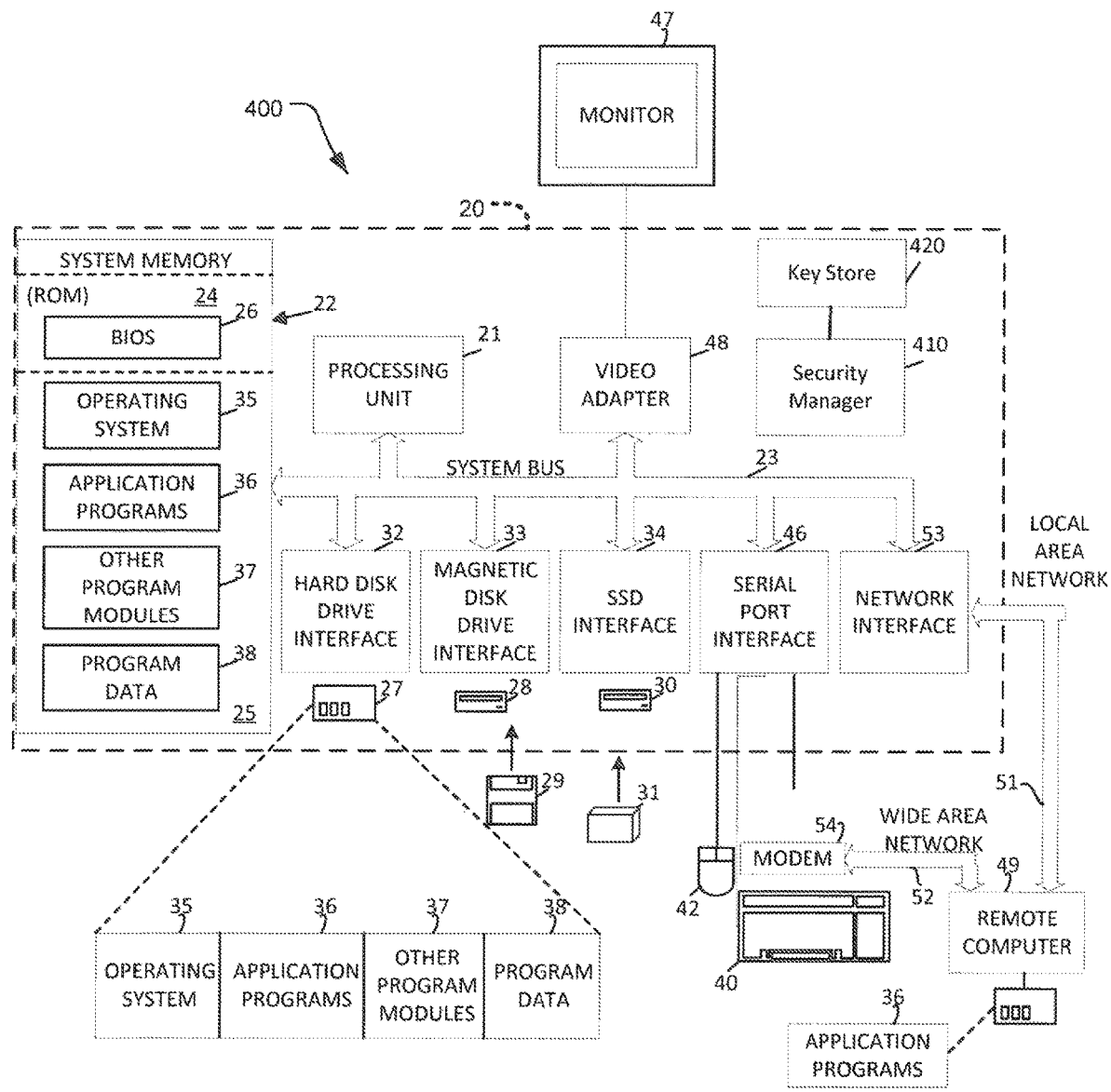
FIG. 4 illustrates example computing device for implementing the virtualized volume level security system disclosed herein.

FIG. 4 illustrates an example computing system 400 that may be useful in implementing the volume lever security system disclosed herein. The example hardware and operating environment of FIG. 4 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 4, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 400, the computer 20 also includes a security manager 410, such as the virtualized volume security manager disclosed herein. The security manager 410 may communicate with key store 420 to control access to one or more virtualized volumes.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory, and includes read-only memory (ROM) 24 and random access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and solid state disk drive 30 for reading from or writing to a solid state disk drive 31.

The computer 20 may be used to implement a volume lever security system disclosed herein. In one implementation, a frequency unwrapping module, including instructions to unwrap frequencies based on the sampled reflected modulations signals, may be stored in memory of the computer 20, such as the read-only memory (ROM) 24 and random access memory (RAM) 25, etc.

Furthermore, instructions stored on the memory of the computer 20 may be used to perform one or more operations disclosed in FIG. 4. Similarly, instructions stored on the memory of the computer 20 may also be used to implement one or more components of FIGS. 1-3. The memory of the computer 20 may also one or more instructions to implement the volume level security system disclosed herein.

The hard disk drive 27, magnetic disk drive 28, and solid state disk drive 30 are connected to the system bus 23 by a hard disk drive interface 32, a magnetic disk drive interface 33, and a solid state drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, solid state drive 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 4 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for the power security manager 410 may be stored in system memory 22 and/or storage devices 29 or 31 and processed by the processing unit 21. One or more instructions for virtualized volume level security scheme and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A networked data storage system, comprising:
   a plurality of virtualized volumes, respective data stored on each of the plurality of virtualized volumes being encrypted using a different key for each of the virtualized volumes and messages to each of the virtualized volumes using a different encryption key for respective ones of the plurality of virtualized volumes, the virtualized volumes being distributed across two or more physical storage drives;
   a key store configured to store a plurality of encryption keys, each of the plurality of encryption keys relating to one of the plurality of virtualized volumes;
   a security manager configured to:
   receive a request from a client to store data to a network resource comprising a plurality of virtualized volumes,
   determine an identity of a target virtualized volume,
   determine an encryption key used to encrypt data to the one of the plurality of virtualized volumes,
   request an encryption key from the key store based on the identity of the target virtualized volume, and
   encrypt a message to the target virtualized volume comprising the data using the encryption key from the key store, wherein respective messages to each of the plurality of virtualized volumes are encrypted using a different one of the plurality of encryption keys corresponding to the virtualized volume to which the respective messages are sent; and
   a first virtualized volume comprising the target virtualized volume that is operative for storing data of the message on a first physical storage drive and encrypting the data using a first key comprising the requested encryption key, and data on the first virtualized volume that is stored on a second physical storage drive is also encrypted using the first key.

2. The networked data storage system of claim 1, wherein the key store is a local key store configured with the security manager.

3. The networked data storage system of claim 1, wherein the key store is configured remotely from the security manager.

4. A networked data storage system, comprising:
a plurality of virtualized volumes, respective data stored on each of the plurality of virtualized volumes being encrypted using a different key for each of the virtualized volumes and messages to each of the virtualized volumes using a different encryption key for respective ones of the plurality of virtualized volumes, the virtualized volumes being distributed across two or more physical storage drives;
a first virtualized volume storing data on a first physical storage drive and encrypting the data using a first key, and data on the first virtualized volume that is stored on a second physical storage drive is also encrypted using the first key, the first virtualized volume receiving a message with the data encrypted with the first key;
a key store configured to store a plurality of encryption keys, each of the plurality of encryption keys relating to one of the plurality of virtualized volumes; and
a security manager configured to:
receive a request from a client to store data to a network resource comprising a plurality of virtualized volumes,
determine an identity of a target virtualized volume,
request and retrieve an encryption key from the key store to encrypt the data,
encrypt a message to the targeted virtualized volume comprising the data to the target virtualized volume, and
store the data using the encryption key on the target virtualized volume.

5. The networked data storage system of claim 4, wherein each of the plurality of virtualized volumes is configured to have a private key corresponding to the one of the plurality of public keys of the key store.

6. The networked data storage system of claim 4, wherein each of the two or more physical storage drives is a self-encrypting drive (SED).

7. A method of secure communication with storage devices, comprising:
receiving, at a virtualized volume security manager, a request from a client to store data to a network resource comprising a plurality of virtualized volumes, wherein respective data stored on each of the plurality of virtualized volumes is encrypted using a different key for each of the virtualized volumes and for messages to each of the virtualized volumes using a different encryption key for respective ones of the plurality of virtualized volumes, the virtualized volumes being distributed across two or more physical storage drives;
determining, by the virtualized volume security manager, an identity of a target virtualized volume;
determining, by the virtualized volume security manager, an encryption key used to encrypt data to the target virtualized volume;
requesting, by the virtualized volume security manager, the encryption key from a key store configured to store a plurality of encryption keys, each of the plurality of encryption keys relating to one of the plurality of virtualized volumes, wherein the requesting the encryption key is based on the identity of the target virtualized volume;
retrieving, by the virtualized volume security manager, the encryption key from the key store that is associated with the target volume level for storage of data in the target volume and for messages directed to the targeted volume;
encrypting, by the virtualized volume security manager, the data using the encryption key;
encrypting, by the virtualized volume security manager, a message to the target virtualized volume comprising the data using the encryption key from the key store, wherein respective messages to each of the plurality of virtualized volumes are encrypted using a different one of the plurality of encryption keys corresponding to the virtualized volume to which the respective messages are sent; and
storing the data encrypted with the encryption key on in a first virtualized volume comprising the target virtualized volume that is operative for storing data of the message on a first physical storage drive and encrypting the data using a first key comprising the requested encryption key, and data on the first virtualized volume that is stored on a second physical storage drive is also encrypted using the first key.

8. The method of claim 7, wherein the retrieving the encryption key associated with the target virtualized volume further comprises retrieving the encryption key from the key store configured remotely from virtualized volume security manager.

9. The method of claim 7, wherein the two or more of a plurality of physical drives associated with the target volume level are self-encrypting drives (SEDs).

10. The method of claim 7, wherein each of the plurality of virtualized volumes is configured to have a private key corresponding to the one of the plurality of public keys of the key store.

11. The method of claim 7, further comprising:
receiving, at the virtualized volume security manager, a request to retrieve data from the one of the plurality of virtualized volumes;
determining target volume level for data retrieval; and
retrieving the encryption key associated with the target volume level.

12. The method of claim 11, further comprising determining the two or more of the plurality of physical drives associated with the target volume level and retrieving data from the one or more of the plurality of physical drives associated with the target volume level.

13. The method of claim 12, wherein decrypting the data retrieved from the two or more of the plurality of physical drives associated with the target volume level using the encryption key associated with the target volume level.

* * * * *